Jan. 5, 1932.   A. P. BUQUOR   1,840,154
EQUALIZING AND SUSPENSION SYSTEM FOR MOTOR VEHICLES
Filed Nov. 21, 1930
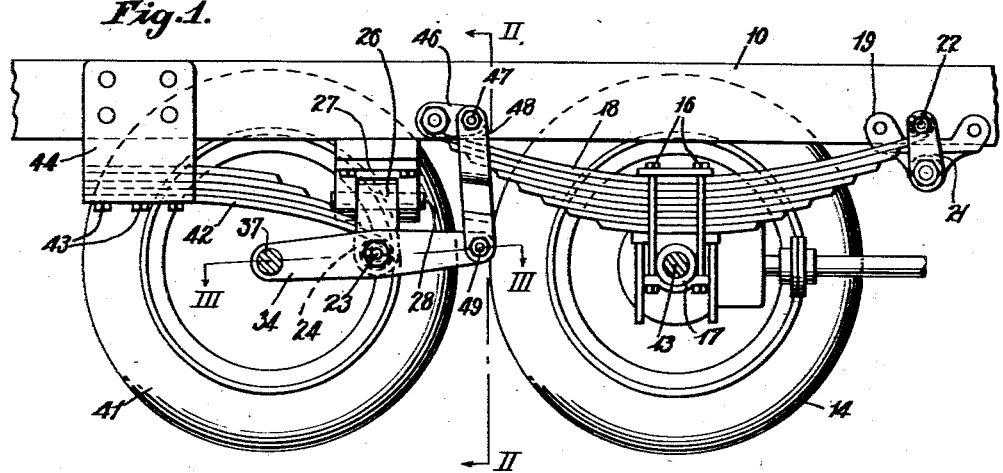
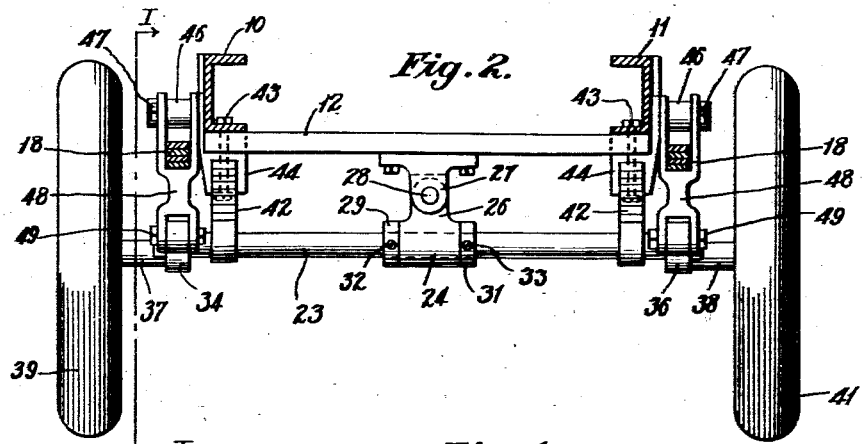
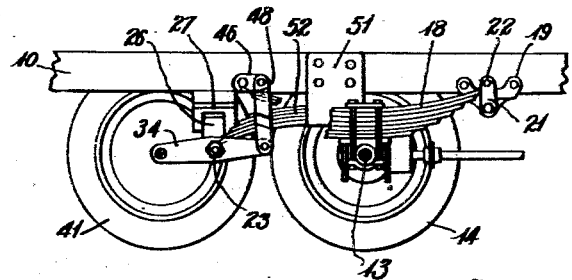
Inventor
A. P. Buquor
By Bacon & Thomas
Attorneys Patented Jan. 5, 1932

1,840,154

UNITED STATES PATENT OFFICE

ADOLPH P. BUQUOR, OF LOS ANGELES, CALIFORNIA, ASSIGNOR, BY DIRECT AND MESNE ASSIGNMENTS, TO MARTIN-PARRY CORPORATION, OF YORK, PENNSYLVANIA, A CORPORATION OF DELAWARE

EQUALIZING AND SUSPENSION SYSTEM FOR MOTOR VEHICLES

Application filed November 21, 1930. Serial No. 497,284.

My invention relates to a load equalizing and spring suspension system for tandem pairs of wheels of motor vehicles, and has for its object the provision of apparatus of the character designated, including a system of compound equalizing levers and springs, which shall be simple and sturdy of design, reliable in operation, and which shall provide for a close, compact spacing of the wheels.

A further object of my invention is to provide means whereby an additional pair of wheels may be provided for the ordinary four-wheel motor vehicle, together with a load equalizing and suspension system for the wheels which shall be effective to provide for the maximum of flexibility of operation coupled with a compact spacing of the wheels.

A more specific object of my invention is to provide a load equalizing and suspension system for motor vehicles, whereby an additional pair of wheels may be added to ordinary four-wheel vehicles, and which shall include means for maintaining the additional wheels in their proper lateral relationship with respect to the truck frame with freedom of movement with respect to the frame.

It is well recognized that the even distribution of the load on the rear of a motor vehicle to four wheels arranged in tandem pairs greatly reduces the concentrated load on the road bed, reduces shocks to the vehicle and its lading, and greatly minimizes tire wear and up-keep cost on the vehicle. In designing a spring suspension and load equalizing system for such apparatus, difficulties have been encountered in the way of obtaining sufficient flexibility in operation, coupled with compactness in the matter of wheel spacing. Another difficulty has been encountered in the provision of means for limiting lateral movement of the wheels with respect to the frame, coupled with freedom of vertical movement with respect thereto.

These and other difficulties are overcome by means of my invention, in which I mount one pair of wheels upon a power driven axle and mount a pair of tandem wheels, closely spaced with respect to the power driven wheels, on stub axles formed on the ends of parallel longitudinally extending levers. The parallel levers are rigidly connected intermediate their ends by a transverse shaft, the shaft being mounted to rock intermediate its ends with respect to the vehicle frame, and being restrained against lateral movement. The transverse shaft is restrained against horizontal angular movement with respect to the frame by means of laminated springs rigidly secured to the vehicle frame. The load on the wheels is equalized by means of a system of springs connected to the frame and to the other ends of the longitudinally extending levers.

Apparatus embodying features of my invention is illustrated in the accompanying drawings, forming a part of this application in which:

Fig. 1 is a sectional elevation of a motor vehicle equipped in accordance with my invention, taken along the line 1—1 of Fig. 2;

Fig. 2 is a sectional view taken along the line 1—1 of Fig. 1;

Fig. 3 is a detail plan view showing the design of the axles for the additional wheels of the vehicle; and Fig. 4 is a view showing a modified form of my invention.

Referring to the drawings for a better understanding of my invention, I show a portion of the vehicle embodying a frame having longitudinal members 10 and 11, and a transverse frame member 12. In the examples shown in Fig. 1, the portion to the right in the drawings is forwardly of the vehicle, and to the left is rearwardly. Mounted beneath the frame is a power driven axle 13 having a pair of wheels 14 mounted thereon, only one of which is shown. Pivotally connected to the axle 13, by means of bolts 16 and a sleeve 17, on each side of the vehicle, is a laminated spring 18. Secured to the longitudinal frame members on each side of the vehicle is a bracket 19 on which is pivotally mounted a spring shackle 21 connected to the forward ends of the springs 18 by means of shackle bolts 22.

Extending transversely of the vehicle beneath the frame is a shaft 23. Mounted on the shaft 23 is a sleeve 24 having formed on one side thereof a boss 26 fitting into a clevis 27 fixedly secured to the transverse frame member 12. A pin 28 connects the boss 26 to the clevis 27 so as to permit oscillatory movement of the shaft 23 in a vertical plane with respect to the vehicle frame. The shaft 23 is restrained against lateral movement with respect to the frame by any suitable means, such as collars 29 and 31 provided on the shaft on each side of the sleeve 24 and secured in place by means of set screws 32 and 33.

Fixedly secured to each end of the shaft 23 are forwardly and rearwardly extending levers 34 and 36, having formed on their rear ends stub axles 37 and 38. Mounted on the stub axles 37 and 38 are a pair of wheels 39 and 41, which wheels are immediately to the rear of the power driven wheels 14. In order to restrain the transverse shaft 23 with the wheels 39 and 41 against oscillatory movement in a horizontal plane, I fixedly secure a laminated spring 42 on each side of the vehicle to the frame members 10 and 11, by means of bolts 43 and a bracket 44 secured to each of the frame members. The free ends of the springs 42 are secured to the transverse shaft 23.

As illustrated in the accompanying drawings, my invention is shown as adapted for the application of an additional pair of wheels to an ordinary four-wheel vehicle, and the spring 18 is the spring usually supplied with such a vehicle. I adapt this spring for proportionally equalizing the load to all of the wheels by connecting the rearward end of each of the springs 18 to the forward ends of the levers 34 and 36. This may conveniently be done, and provide greater compactness of design, by connecting a spring shackle 46 to the rearward end of each of the springs 18, and turning it over the spring forwardly to connect by means of a bolt 47 with a link 48, which link is connected by means of a bolt 49 to each of the levers 34 and 36.

Referring now to Fig. 4 of the drawings, I show a modified form of my invention, which may be desirable in certain designs. In this figure of the drawings, the mounting of the additional wheels is the same as that previously described and need not be repeated. It differs from the modification already described, in that I provide a bracket 51 on each of the longitudinal frame members intermediate the tandem pairs of wheels and secure thereto a leaf spring 52 which extends rearwardly to connect to the transverse shaft 23, instead of forwardly, as does the spring 42. In all other respects, this modification of my invention is the same as already described.

From the foregoing description the advantages of my invention will become readily apparent. The means provided for suspending the additional wheels by the transverse shaft 23 and levers 34 and 36 permits an extremely close spacing of the wheels, which is advantageous in rounding curves, as it greatly reduces side slippage of the wheels on the roadway  The levers 34 and 36 acting through the springs 18 permit a maximum of flexibility of vertical movement, while the oscillatory movement of the shaft 23 in a vertical plane serves to further distribute the load and shocks to all the vehicle wheels.

While I have shown my invention in but two forms, it will be obvious to those skilled in the art that it is not so limited, but is susceptible of various other changes and modifications, without departing from he spirit thereof, and I desire, therefore, that only such limitations shall be placed thereupon as are imposed by the prior art or as are specifically set forth in the appended claims.

What I claim is:

1. In a suspension and load equalizing system for motor vehicles, a power driven axle, a pair of wheels on the power driven axle, a pair of wheels arranged in tandem with the power driven wheels, axles for the tandem pair of wheels, a transverse shaft operatively connected to the axles for the tandem pair of wheels, a frame for the vehicle, means connecting the transverse shaft to the vehicle frame for oscillatory movement in a vertical plane, and a system of springs and levers for proportionally transmitting the load of the vehicle frame and lading to all of said wheels.

2. In a suspension and load equalizing system for motor vehicles, a power driven axle, a pair of wheels on the power driven axle, a pair of wheels arranged in tandem with the power driven wheels, axles for the tandem pair of wheels, a transverse shaft operatively connected to the axes for the tandem pair of wheels, a frame for the vehicle, means connecting the transverse shaft to the vehicle frame for oscillatory movement in a vertical plane, a system of springs and levers for proportionally transmitting the load of the vehicle frame and lading to all of said wheels. and means for restraining said transverse shaft against oscillatory movement in a horizontal plane.

3. In a suspension and load equalizing system for motor vehicles, a power driven axle, a pair of wheels on the power driven axle, a vehicle frame, a transverse shaft extending across beneath the frame and mounted intermediate its ends for oscillatory movement in a vertical plane with respect to the frame, a pair of longitudinally extending levers fixedly secured intermediate their ends to the ends of the transverse shaft, a stub axle on one end of each of the levers, a pair of wheels mounted on the stub axles in tandem with the power driven wheels, a pair of laminated springs, each connected intermediate its ends to the power driven axle and at one end to the vehicle frame, and means connecting the other ends of said springs to the free ends of the longitudinally extending levers.

4. In a suspension and load equalizing system for motor vehicles, a power driven axle, a pair of wheels on the power driven axle, a vehicle frame, a transverse shaft extending across beneath the frame and mounted intermediate its ends for oscillatory movement in a vertical plane with respect to the frame, a pair of longitudinally extending levers fixedly secured intermediate their ends to the ends of the transverse shaft, a stub axle on one end of each of the levers, a pair of wheels mounted on the stub axles in tandem with the power driven wheels, a pair of laminated springs, each connected intermediate its ends to the power driven axle and at one end to the vehicle frame, means connecting the other ends of said springs to the free ends of the longitudinally extending levers, and means for restraining the transverse shaft against oscillatory movement in a horizontal plane.

5. In a tandem wheel attachment for the rear of four-wheel motor vehicles, the combination with a vehicle frame, of a transverse shaft mounted beneath the frame for oscillatory movement with respect to said frame, levers extending transversely of the shaft and fixedly secured intermediate their ends to the ends of the transverse shaft, stub axles formed on the rearward ends of the levers, a pair of wheels mounted on the stub axles, a power driven axle having wheels mounted thereon disposed ahead of said first-mentioned wheels, and load equalizing means connecting the forward ends of the levers with the power driven axle and with the vehicle frame.

6. In a tandem wheel attachment for the rear of four-wheel motor vehicles, the combination with a vehicle frame, of a transverse shaft mounted beneath the frame for oscillatory movement with respect to said frame, a laminated spring on each side of the vehicle fixedly secured at one end to the frame and at its other end to the transverse shaft, a lever fixedly secured at each end of the shaft and having its ends extending forwardly and rearwardly therefrom, a stub axle on the rearward end of each of the levers, a pair of wheels mounted on the stub axles, a power driven axle having wheels mounted thereon disposed ahead of the first-mentioned wheels, a laminated spring pivotally mounted intermediate its ends on the power driven axle on each side of the vehicle, and means connecting the ends of said springs to the frame and the forward ends of the levers.

7. In a tandem wheel attachment for the rear of four-wheel motor vehicles, the combination with a vehicle frame, of a transverse shaft mounted beneath the frame for oscillatory movement with respect to said frame, a laminated spring on each side of the vehicle fixedly secured at one end to the frame and at its other end to the transverse shaft, a lever fixedly secured at each end of the shaft and having its ends extending forwardly and rearwardly therefrom, a stub axle on the rearward end of each of the levers, a pair of wheels mounted on the stub axles, a power driven axle having wheels mounted thereon disposed ahead of the first-mentioned wheels, a laminated spring pivotally mounted intermediate its ends on the power driven axle on each side of the vehicle, means connecting the ends of said springs to the frame and the forward ends of the levers, and means restraining the transverse shaft from lateral movement with respect to the frame.

In testimony whereof I affix my signature.

ADOLPH P. BUQUOR.